United States Patent [19]

Mercier

[11] 4,147,073

[45] Apr. 3, 1979

[54] GARAGE DOOR OPENER

[76] Inventor: Carl Mercier, 36909 Lisbon Rd., Oconomowoc, Wis. 53066

[21] Appl. No.: 812,165

[22] Filed: Jul. 1, 1977

[51] Int. Cl.[2] ..................................................... F16H 1/18

[52] U.S. Cl. .................................. 74/424.8 R; 49/199; 49/139

[58] Field of Search ................. 49/139, 118, 215, 280, 49/199; 74/424.8 R

[56] References Cited

U.S. PATENT DOCUMENTS

| | | | |
|---|---|---|---|
| 2,221,039 | 11/1940 | Babcock | 49/139 |
| 2,686,577 | 8/1954 | Hoppenjans | 49/280 X |
| 3,051,014 | 8/1962 | Houk | 74/424.8 R |
| 3,069,151 | 12/1962 | Cook et al. | 49/139 |
| 3,261,728 | 7/1966 | Slopa et al. | 49/139 |
| 3,772,141 | 3/1973 | Miller | 49/139 |
| 3,858,452 | 1/1975 | Gatland et al. | 4/139 |
| 3,909,980 | 10/1975 | Courtney | 49/199 |
| 3,996,697 | 12/1976 | Bailey et al. | 49/139 |
| 4,028,850 | 6/1977 | Marzocco | 49/212 |

*Primary Examiner*—Kenneth Downey
*Attorney, Agent, or Firm*—Fred Wiviott

[57] ABSTRACT

The invention relates to a power door opener, such as the type of opener used for opening overhead garage doors includes a worm gear rod having a major thread and a carrier member coupled to the door and releasably engageable with the major thread for moving the door between open and closed positions as the rod rotates. A second thread whose pitch is smaller than the major thread is formed on the rod and on a portion thereof located between a pair of spaced apart limit switches. A control member threadably engages the second thread for movement between the limit switches as the rod rotates for terminating motor operation as the door moves into its open and closed positions. The carrier member is mounted for radial movement into and out of engagement with the major thread to permit manual operation of the door.

7 Claims, 6 Drawing Figures

GARAGE DOOR OPENER

FIELD OF THE INVENTION

The invention relates generally to the art of door openers and more particularly to the art of door openers useful for mechanically opening and shutting overhead garage doors and the like. Still more specifically the invention relates to garage door openers which include means for permitting manual operation of the door in the event of power failures and to garage door openers which include switches for limiting travel of the door between two positions, i.e. fully open and full closed.

BACKGROUND OF THE INVENTION

Garage door openers are known for moving overhead garage doors between open and shut positions, usually in response to a radio signal from a car transmitter or in response to an electrical signal generated by an electrical switch. While such openers have received widespread commercial acceptance, there are still several problems which have not been fully overcome. One of such problems is the ability to quickly and easily adapt the door opener for manual operation so that the door can be lowered or raised during a power failure. Another of such problems is providing reliable and accurate means for controlling the movement of the door between fully open and fully closed positions.

The problems of alternately coupling and uncoupling a garage door to an electrically powered drive system is complicated by the fact that in most garage door openers a drive linkage must be securely coupled to the door. Most drive systems include some sort of track with a gear rod mounted within the track and a carrier engaging the gears for movement along the track. The carrier, in turn, is coupled to the door. A typical garage door opener is shown in Houk's U.S. Pat. No. 3,051,014 issued Aug. 28, 1962, for "Screw and Nut Mechanism" and this patent discusses the problem of manual versus power operation and one mechanism for disconnecting a carrier from the drive gear.

The disconnect system of the Houk Patent includes a cam device which is rotatable into a first position for urging a nut into contact with a drive screw and which is rotatable into a second position to locate the nut away from the drive screw and permit manual operation of an overhead garage door. A compression spring is provided for retaining the cam follower control rod in one of its two operating positions. While the system does permit disconnection of the door-opener linkage from the drive gear, it is relatively complex in terms of manufacture and operation and the use of a compression spring as part of the system could lead to failure in the event of spring fatigue.

Several types of devices are incorporated in prior art garage door openers for controlling the movement of the door between open and shut positions. Most typically such devices incorporate limit switches triggered by the door opener linkage or a timing device which activates the drive system for a predetermined time. While most of these systems have satisfactory reliability, there is a tendency for the accuracy to diminish after extended use and some garage constructions make it difficult to easily and properly install the limit devices.

A garage door opener which overcomes the aforementioned disadvantages would be a significant advance in this technology.

OBJECTS OF THE INVENTION

It is a primary object of the present invention to provide a door opener for overhead doors, such as garage doors, which includes means for permitting manual door operation as well as power operation.

Another object of the invention is to provide such a door opener which includes a drive means and control means for limiting movement of the door between two preselected positions.

Yet another object of the present invention is to provide a worm gear drive rod and carrier means for a garage door and means for selectively engaging said carrier means to said gear drive rod.

A still further object of the present invention is to provide limit control means for worm gear door openers, said limit control means including limit switches and limit switch contact means movable on said worm gear rod between two preselected locations.

How these and other objects of the present invention are accomplished will be described in the following specification taken in conjunction with the FIGURES. Generally, however, the objects are accomplished by providing an overhead garage door opener which includes an elongate worm gear rod mounted adjacent the ceiling of a garage and power means for controlling rotation of the worm drive system. The worm gear is supported within an elongate track which includes an upper portion for being attached to the ceiling of the garage and a lower portion for mounting a carrier for longitudinal movement parallel to the rod. The carrier, in turn, is attached by suitable linkage means to the top of a garage door. Rotation of the gear rod causes movement of the carrier and simultaneous raising or lowering of the garage door until the carrier reaches a preselected position.

In the preferred embodiment of the present invention, the carrier may be quickly disconnected from the worm gear of the drive system by loosening two wing nuts to permit the gear engaging portion of the carrier to be lowered out of contact with the worm gear, but the carrier is still free to travel along the track. This permits the door to be opened manually, and reconnection of the carrier is accomplished by reengaging the carrier and the drive gear and tightening the wing nuts. The limited control mechanism of the present invention includes a pair of limit switches, preferably in the housing which contains the light and electrical components of the garage door opener. The limit switches are arranged adjacent the drive rod which continues through such housing and a specially designed block member is mounted on the drive gear for travel between the limit switches and for contact therewith. The gearing on the block and the portion of the drive rod between the limit switches is selected to permit the block to travel from one limit switch to the other while the drive system moves the garage door between open and shut positions. Various modifications of the present invention are also described in the following specification.

DESCRIPTION OF THE PREFERRED EMBODIMENT

Figure 1:
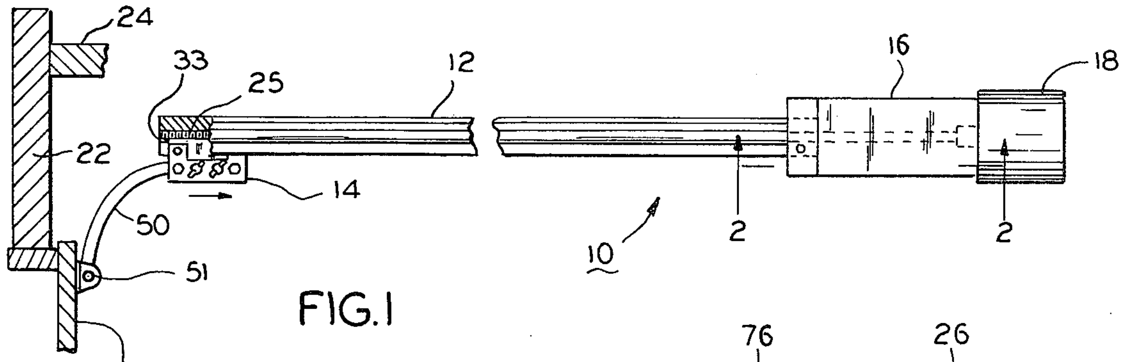
FIG. 1 is a side view, with parts broken away, showing in general form the garage door opener of the preferred embodiment of the present invention.

The garage door opener 10 according to the preferred embodiment of the present invention is illustrated in general form in FIG. 1 to include a track 12, a door carrier 14 adapted for moving longitudinally along track 12, a housing 16 at one end of the track and a motor 18. Opener 10 is designed to be attached to the ceiling 24 of a garage and for raising and lowering a garage door 20, such as the type of overhead garage door which is mounted between a pair of parallel track members (not shown) on either side of the door opening. The door and track system are well known in the art and, in and of themselves, form no part of the present invention. The garage doors typically include a number of hinged sections to permit the door to travel along a curved path adjacent the roof of the garage and then along a length of straight track to the fully opened position. In FIG. 1, the upper portion of the garage door frame is shown at 22.

Figure 2:
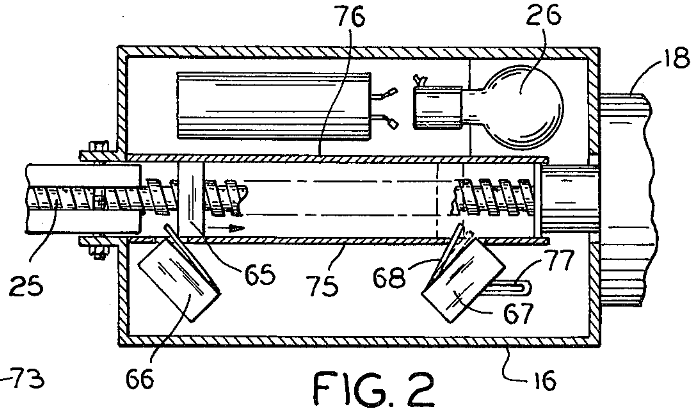
FIG. 2 is a view taken along the line 2—2 of FIG. 1 showing the limit control system of the present invention.

As can best be appreciated by simultaneous reference to FIGS. 1 and 2 opener 10 also includes an elongate worm gear rod 25 which extends within track 12, through housing 16 and is coupled to motor 18 for being axially rotated in either direction. Worm gear 25 has a major helical thread 25' which extends axially. The details of the electronic circutry of opener 10 will not be described in this application, but for purposes of illustration motor 18 rotates rod 25 clockwise with reference to the garage door frame 22 to open the door and counterclockwise with reference to frame 22 to close the door.

Suitable electrical connections are made to motor 18 and housing 16 for selecting the opening or closing mode in response to a radio or electrical signal generated by the garage door operator. A light 26 is shown within housing 16 for illuminating the garage during certain intervals in the operation of opener 10. Light 26 is usually turned on when the door is being opened and closed and for a preselected time after the openeing or closing operation as is also known as the art. Also provided within housing 16 is a system for stopping the garage door travel and reversing the direction of rotation of rod 16 should the door hit an obstruction, e.g. a child's bicycle. This latter system is also conventional and will not be described in detail.

Figure 4:
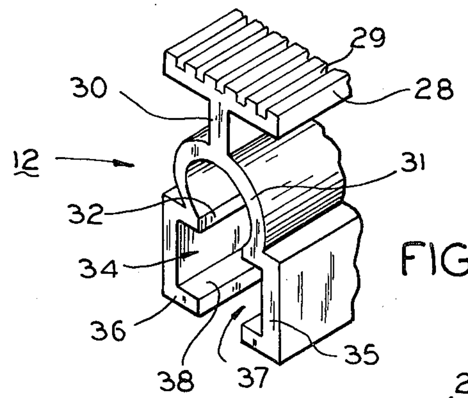
FIG. 4 is a perspective view of a portion of the track member used for supporting the carrier and drive gear of the preferred embodiment of the present invention.

FIG. 4 shows the preferred track member 12 useful in the present invention to include four integral sections. Track 12 includes an upper elongate plate 28 for being secured in the ceiling 24 of the garage. Plate 28 in the illustrated form is shown to include a number of grooves 29 along its length for structural strength and reduced weight, but the grooves 29 are not essential. Not shown in FIG. 4 are the holes through plate 28 which provide means for securing track 12 to the ceiling 24 of the garage, e.g. by screws, bolts, nails, etc. Plate 28 is mounted to ceiling 24 perpendicularly to the door frame and centrally between the tracks which hold the garage door 20.

The second component of track 12 is a spacer strut 30 which extends below and generally perpendicularly to plate 28 along the length of track 12. Below strut 30 is a generally cylindrical tube 31 which is adapted for containing gear rod 25. Tube 31 includes a slot 32 along its bottom. In the preferred embodiment of the present invention the internal diameter of tube 31 exceeds slightly the outside diameter of rod 25 and at the end of tube 31 nearest the garage door 20 a cylindrical socket 33 is provided for receiving one end of rod 25 and aligning it in the center of tube 31.

The final component of track 12 is a generally square channel 34 which extends below tube 31. Channel 34 is formed by a pair of sides 35 which extend downwardly from tube 31 and a pair of legs 36 which are perpendicular to sides 35 and located at the bottom edge threof. Legs 36 are inwardly directed but spaced apart from one another so that another slot 37 is provided in Channel 34 at its bottom. Each leg 36 includes an upper flat surface 38 which extends along the length of track 12 to provide a support surface for carrier 14 as will be more fully described below.

Figure 5:
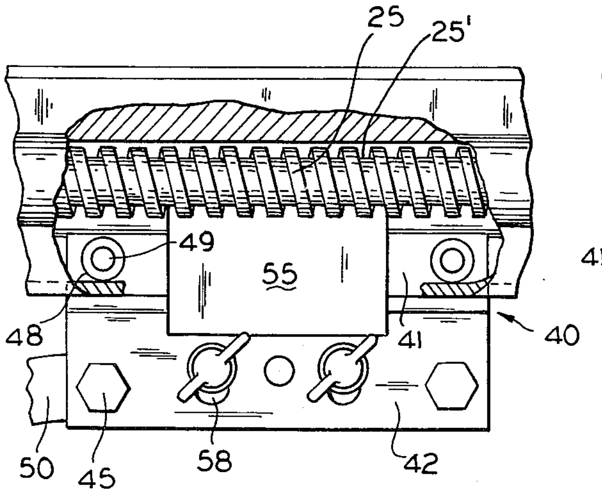
FIG. 5 is a side view, with parts broken away, showing the door carrier means of the present invention engaging the drive gear.
Figure 6:
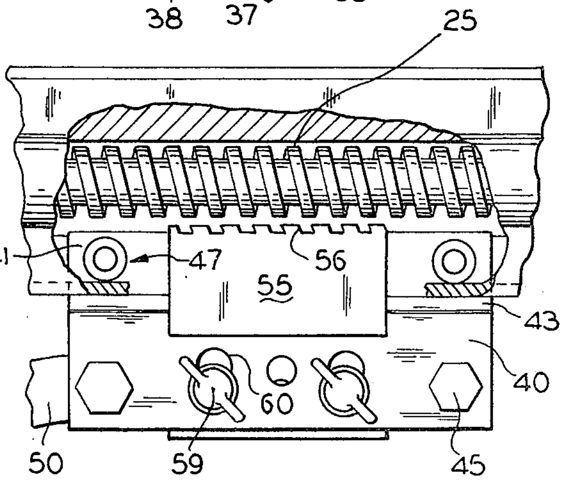
FIG. 6 is a side view, with parts broken away, similar to FIG. 5, except showing the carrier means of the present invention disconnected from the drive gear.

The garage door carrier 14 is shown in detail in FIGS. 5 and 6 and includes a pair of spaced apart plate members 40, only the near one of which is visible in the FIGURES. Plates 40 include an upper portion 41 and a lower portion 42, the two portions being generally planar and parallel to one another. Upper portions 41 are disposed within channel 34 and parallel to sides 35 while the lower portions are disposed below channel 34 and are generally coplanar with sides 35. A bend 43 of about 90° is provided in each of plates 40 to provide the desired configuration.

The plates 40 of carrier 14 are secured to and spaced from one another by a pair of spacer bolts 45 which pass through the plates 40 and by a pair or roller assemblies 47 adjacent respectively the leading and trailing edges of portion 41. The roller assemblies 47 are shown in only a general form but it should be appreciated that four rollers 48 are supported on shafts 49 between portions 41 of plates 40 and sides 35 of channel 34 for travel along the top surfaces 38 of legs 36. Roller bearings can be provided if desired. A spacer tube (not shown) is preferably provided between portions 41 on shafts 49 to maintain the desired spacing between the plates 40.

The connection between carrier 14 and garage door 20 is shown in FIGS. 1, 5 and 6 to include a carrier arm 50 one end of which is pivotally mounted to a bracket 51 at the top of door 20 and the other end of which is rotatably mounted to the front spacer 45 of carrier 14. The described means for connecting a door carrier to a door should not be taken as limiting however, because a number of different designs can be employed with the various types of garage doors known to the art.

The final component of carrier 14 to be described is the gear rod engagement assembly shown in detail in FIGS. 5 and 6. A generally rectangular plate member 55 is disposed between plates 40 for sliding movement toward or away from gear rod 25. The upper edge of plate 55 includes a plurality of teeth 56 adapted for meshing with the major gear thread 25' of rod 25 when plate 55 is in the position shown in FIG. 5. As shown in FIG. 6, the teeth 56 are out of engagement with thread 25' when the plate 55 is in the position shown in that FIGURE.

It will be appreciated from observing FIGS. 5 and 6 that the carrier 14 is moved by rotation of rod 25 when plate 55 engages rod 25 (FIG. 5) and that the carrier 14 can be moved manually by sliding the rollers 48 within channel 34 when plate 55 is displaced from rod 25. The selection of manual or gear operated movement of carrier 14 is accomplished quickly and easily by providing a pair of wing nuts 58 and bolts 59. Bolts 59 are secured to plate 55 and pass through oblong holes 60 on plates 40, the holes being oriented perpendicularly with respect to the ceiling 24 of the garage.

The operation of carrier 14 can now be explained. When the carrier 14 is position shown in FIG. 5 it can be moved only if rod 25 is rotated in either direction by motor 18. Teeth 56 of plate 55 engage the major thread 25' of gear rod 25 and rollers 48 are disposed on the surfaces 36 of channel 34. Bolts 59 are located at the upper end of holes 60 and are locked in that position by wing nuts 58.

In the event of a power failure, or if for any other reason it is desired to move carrier 14 manually, the wing nuts 58 are loosened causing bolts 59 to fall to the bottom of holes 60. This causes plate 55 to disengage rod 25 but does not change the location of rollers 47 with respect to track 12. When the carrier 14 is in the position shown in FIG. 6 the garage door 20 can be opened or closed by hand. After the power failure is repaired, the garage door carrier 14 is quickly reconnected by pushing the plate 55 upwardly so that teeth 56 again engage the threads of the gear rod 20 and tightening the nuts 58.

Before proceeding to the description of another important feature of the present invention, it should be mentioned here that many different metal or plastic materials may be used for constructing the various components of garage door opener 10. Metals, such as cast or extruded aluminum, can be employed for the track 12, plates 40 and housing 16, while the gear rod is preferably constructed from a harder material such as steel. Synthetic materials such as teflon or nylon may be employed, e.g. for plate 55 and rolers 48. One skilled in the art, after reading the specification, could readily select appropriate materials taking into consideration costs, strength requirements, decorative needs, etc.

Figure 3:
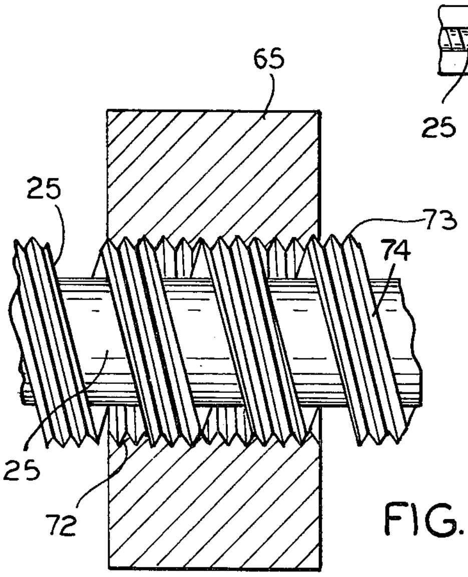
FIG. 3 is a detailed side view of the limit control block and a portion of the drive gear according to the preferred form of the present invention.

FIGS. 2 and 3 illustrate a second feature of the present invention, i.e. a system for accurately controlling movement of the garage door 20 between two positions. In FIG. 2, a bottom view of the internal components of housing 16, it can be seen that the control mechanism includes a rectangular nut 65 and a pair of contact limit switches 66 and 67. Limit switches 66 and 67 are coupled to motor 18 by means (not shown) for stopping rotation of gear rod 25 each time one of the limit switches is closed and signaling the motor that the direction of rotation is to be reversed the next time the motor is activated.

For example if nut 65 travels from the position shown in solid lines in FIG. 2 to the position shown in dotted lines as rod 25 is rotated in a clockwise direction, when the nut 65 closes limit switch 67 by pressing against the contact plate 68 thereof, rotation of rod 25 stops and a signal is generated to motor 18. The next time the garage door opener 10 is activated, the motor 18 will rotate the rod 25 in a counterclockwise direction causing nut 65 to move back to the position shown in FIG. 2. Contact of nut 65 with plate 70 of switch 66 again stops motor 18 and signals the motor 18 to reverse the direction of rotation the next time the opener 10 is activated. It should again be mentioned that the control circuitry for switches 66 and 67 is independent from the circuitry normally provided in garage door openers for quickly reversing the direction of rotation if the door hits an obstruction. That curcuitry is conventional and is primarily a safety feature while the present invention relates to controlling the desired limits of door travel between open and closed positions.

It will appear to one skilled in the art that other types of switches may replace contact switches 66 and 67. For example, similar results can be obtained by using photoelectric switches to sense the movement of nut 65 between two preselected positions.

Referring to FIG. 3, the nut 65 is shown to include a threaded hole 72 and a second thread 73 is formed on the outer surface 74 of the major thread 25 and is located between limit switches 66 and 67. The engagement of threads 72 and 73 causes the movement of block 65 along rod 25 as the latter rotates. To prevent block 65 from merely rotating axially around rod 25, a pair of guide surfaces 75 and 76 are provided in housing 16. Surfaces 75 and 76 in the illustrated embodiment extend downwardly from the top of housing 16. The bottom of nut 65 is not so that proper contact with limit switches 66 and 67 is made possible.

The choice of thread size for threads 72 and 73 is an important feature of the present invention. As can be seen in FIG. 1 the length of track 12 will be many times the length of housing 16 and carrier 14 will need to travel nearly the entire length of track 12 as the door 20 is moved from its fully closed to its fully opened positions. On the other hand, it is desired to have nut 65 move a much shorter distance within housing 16 during the same number of rotations of rod 25. This is accomplished in the present invention by providing relatively closely spaced threads 72 and 73.

When opener 10 is installed and connected to garage door 20, adjustment is made to set the control mechanism for the particular size door. A taller door will obviously require more rod rotations and longer movement of carrier 14 and nut 65 than will a shorter door. The adjustment is made by moving limit switch 67 toward or away from switch 66 by a distance which will allow for the distance between the two switches. A slot 77 is shown in FIG. 2 for allowing the adjustment of swtich 67 and lock means (not shown) are provided for locking switch 67 to its final location. It should also be noted that the movement of the door is not instantaneously stopped by switches 66 and 67 due to the inertia of the moving door and motor. It is quite common the door 20 will move several inches after the motor 18 is stopped and this fact should be taken into consideration when adjusting the relative positions of the switches.

Again, a number of different materials can be used for constructing block 65, e.g. metals or plastics, but in the preferred embodiment the block is constructed from a wear resistant steel. Teflon or nylon blocks are also quite satisfactory.

While the invention has been illustrated and described in connection with garage doors, it should be appreciated that the quick release and limit control features of the present invention have utility with other types of door or gate closing devices. So while the specification is limited to only a single preferred embodiment, the invention is not to be so limited but is to be limited solely by the claims which follow.

I claim:

1. A door opener including elongate rod means having a major thread formed thereon, reversible motor means coupled to said rod for reversibly rotating said rod means about its longitudinal axis, carrier means adapted to be coupled to a door and cooperating with said major thread for longitudinal movement between first and second positions relative to said rod means in response to rotation thereof, a pair of spaced apart switch means disposed adjacent a portion of said rod means, the distance between said switch means being substantially shorter than that between said first and second positions, a second thread formed on at least that portion of said rod means between the positions of said switch means, a threaded switch activating member mounted on said rod means and engaging the second thread thereof for movement between said switch means in response to rotation of said rod means, means coupling said switch means to said motor means whereby activation of said switch means controls the energization of said motor, the pitch of said major thread being substantially greater than that of said second thread whereby said carrier means is moved by said motor means between its first and second positions as said actuating member travels between said switch means.

2. The door opener set forth in claim 1 wherein the rod means comprises a worm gear rod, said major thread comprising at least one helical groove formed in said rod, said second thread being formed on the surface of said rod between the convolutions of said groove.

3. The door opener set forth in claim 2 wherein said motor output shaft is coaxial with said rod and being coupled thereto wherein said major thread, said second thread and said motor output shaft are coaxial.

4. The invention set forth in claim 3 wherein said door opener also includes a housing, said rod extending through said housing with said second thread being disposed therein, said switch means and said activating member also being disposed within said housing.

5. The invention set forth in claim 4 wherein said activating member comprises a nut means, said nut means being constrained against axial rotation.

6. The invention set forth in claim 3 wherein said switch means comprise contact limit switches and said activating means comprises a nut means adapted to contact said limit switches.

7. The invention set forth in claim 3 wherein at least one of said switches is longitudinally adjustable with respect to said rod and said other switch whereby the opener is adjustable for used with different sizes of doors.

* * * * *